(12) United States Patent
Oikawa

(10) Patent No.: US 7,486,857 B2
(45) Date of Patent: Feb. 3, 2009

(54) TEMPERATURE-INDEPENDENT OPTICAL WAVELENGTH IDENTIFICATION APPARATUS AND OPTICAL WAVELENGTH IDENTIFICATION METHOD

(75) Inventor: Yoichi Oikawa, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/783,392

(22) Filed: Apr. 9, 2007

(65) Prior Publication Data

US 2007/0297718 A1     Dec. 27, 2007

(30) Foreign Application Priority Data

Jun. 21, 2006   (JP) .............. 2006-171930

(51) Int. Cl.
G02B 6/34 (2006.01)
G02B 6/24 (2006.01)
(52) U.S. Cl. .......................... 385/37; 385/27
(58) Field of Classification Search ............ 385/27, 385/37
See application file for complete search history.

(56) References Cited

U.S. PATENT DOCUMENTS

| | | | |
|---|---|---|---|
| 4,792,217 A | 12/1988 | Yoshioka | |
| 5,986,793 A | 11/1999 | Yamaguchi et al. | |
| 7,054,515 B1 * | 5/2006 | Trisnadi et al. | 385/14 |
| 2004/0170109 A1 | 9/2004 | Asada et al. | |
| 2006/0228071 A1 * | 10/2006 | Davis et al. | 385/16 |
| 2006/0228072 A1 * | 10/2006 | Davis et al. | 385/18 |

FOREIGN PATENT DOCUMENTS

| | | |
|---|---|---|
| JP | 63-264716 | 11/1988 |
| JP | 01-220234 | 9/1989 |
| JP | 10-133087 | 5/1998 |
| JP | 11-64757 | 3/1999 |
| JP | 2004-281033 | 10/2004 |

OTHER PUBLICATIONS

"Optics" Eugene Hecht. Adelphi University. 2002. pp. 246-253.

* cited by examiner

Primary Examiner—Michelle R Connelly Cushwa
Assistant Examiner—Rhonda S Peace
(74) Attorney, Agent, or Firm—Staas & Halsey LLP

(57) ABSTRACT

The distance between an optical diffraction device and a focusing lens, and the coefficient of the focal length change of the focusing lens, are adjusted based on the calculation expression of wavelength identification errors in light of temperature change of a member making up light receiving means (e.g., PD array), thereby performing correction of wavelength identification errors, whereby optical wavelength identification can be performed with high precision even when the temperature changes.

13 Claims, 12 Drawing Sheets

TEMPERATURE-INDEPENDENT OPTICAL WAVELENGTH IDENTIFICATION APPARATUS AND OPTICAL WAVELENGTH IDENTIFICATION METHOD

BACKGROUND OF THE INVENTION

1. Field of the Invention

The present invention relates to an optical wavelength identification apparatus, and particularly relates to an optical wavelength identification apparatus, and an optical wavelength identification method, whereby optical wavelength identification error occurring along with temperature change can be accurately corrected.

2. Description of the Related Art

An environment which can reap the benefits of broadband Internet service is being implemented, due to the rapid spread of high-speed access networks employing a band of several to 100 Mbit/s or so, such as recent FTTH (Fiber to the Home), ADSL (Asymmetric Digital Subscriber Line), and so forth, and in order to correspond to increase of communication demand, with a backbone network (core network), extremely large capacity optical communication systems employing the wavelength multiplex technology are now under construction. On the other hand, with a connection portion between a metro network and a core network, the limit of electric switching capabilities still remains, and there is concern that that band bottleneck might occur at this portion. Accordingly, it is conceived as effective means to build new photonic network architecture for directly connecting between an access network and a core network at an optical region without providing an electric switch therebetween, and research and development are being actively pursued in various places. With these optical networks, technique for monitoring of multiple wavelength light components included in light signals and for detecting wavelengths thereof at optical nodes disposed in a core network, metro core network, metro access network, and so forth, is increasingly important.

A configuration example of an optical wavelength detection system will be shown in FIG. 1.

With this configuration example, an optical diffraction device 100, a focusing lens 200, and light receiving means 300 are fixed on a board 400.

The optical diffraction device 100 disperses incident light into light components having multiple wavelengths included in the light thereof. The focusing lens 200 refracts the respective incident light components and focuses these upon the light receiving surface of the light receiving means 300. The light receiving means 300 detect, based on the incident position of the light receiving surface of each light component, the wavelength of the light component thereof. With the configuration example in FIG. 1, light components 40 focused from the focusing lens 200 (FIG. 1 illustrates the optical paths of three light components) are configured so as to temporally change the directions thereof at a reflection mirror 390 to perpendicularly enter the light receiving surface of the light receiving means 300. Here, the example shows a case of employing a PLC (Planner Lightwave Circuit) type spectral element serving as the optical diffraction device 100, and a PD (Photo Diode) array serving as the light receiving means 300.

With the configuration such as FIG. 1, when temperature changes, along with the thermal expansion of the board, the distance between the optical diffraction device 100, the focusing lens 200, and the light receiving means 300, and the focal length of the focusing lens 200 change, and along therewith, the incident positions of the light components focused on the light receiving surface of the light receiving means change, so it is necessary to correct the change thereof.

As for a technology for correcting influence due to such temperature change, with an optical pickup, laser collimator apparatus, and so forth, a technology has been disclosed wherein the focal length change due to temperature is cancelled out by thermal expansion such as the casing of an optical part. Japanese Unexamined Patent Application Publication No. 63-264716 discloses a projection lens for compensating the change of the focal position due to temperature change, Japanese Unexamined Patent Application Publication No. 1-220234 discloses a technology for compensating the focal length change along with the temperature change of a collimator lens, and the relative position change between a light source and the collimator lens due to use of a compensating member, Japanese Unexamined Patent Application Publication No. 10-133087 discloses a technology for compensating the temperature change of the focal position of an optical system, Japanese Unexamined Patent Application Publication No. 2004-281033 discloses a technology for suppressing the amount of astigmatism due to the temperature change, and Japanese Unexamined Patent Application Publication No. 11-64757 discloses a technology for canceling out the change of the focal length due to temperature change.

As described above, with the conventional technologies, correction is made regarding the change caused by the expansion of the board material due to temperature change, and the focal length change of the focusing lens, but the expansion due to the temperature change of a PD array member for detecting light components is not taken into consideration. The conventional correction methods select a material for conforming the lens focal length change due to temperature, and the amount of change due to thermal expansion of the material of the board for fixing between the diffraction device and the focusing lens, and between the focusing lens and the PD array, or a material for approximating the lens focal length change to zero as much as possible, and also approximating the thermal expansion of the member to zero as much as possible. However, the thermal expansion of the PD array itself is not taken into consideration, and accordingly it has been difficult to completely suppress the identification errors of the optical wavelength due to temperature change.

With optical wavelength measurement, an optical wavelength selection switch, and so forth in an optical transmission network, high-precision wavelength identification is demanded, and a higher-precision wavelength identification method for also taking the expansion of the member itself making up the PD array into consideration is demanded.

SUMMARY OF THE INVENTION

Accordingly, it is an object of the present invention to provide an optical wavelength identification apparatus and a wavelength identification method, which can correct optical wavelength identification errors due to temperature change, and perform high-precision optical wavelength identification even when temperature changes.

With the present invention, an arrangement is made wherein an optical wavelength identification apparatus comprises: an optical diffraction device for dispersing light into light components each having different wavelength; a focusing lens for focusing the light components dispersed from the optical diffraction device, the focusing lens having a predetermined focal length f and a focal length temperature coefficient β; a light receiving device for identifying wavelengths of the light components based on incident positions of the light components focused, the light receiving device being made of material having a predetermined temperature coefficient $\alpha_s$; and a board for fixing the optical diffraction device, the focusing lens, and the light receiving device, the board being made of material having a predetermined temperature coefficient $\alpha$, the distance between the focusing lens and the light receiving device being set at f; wherein, for a distance coefficient k ($0<k\leq 1$), the distance between the optical diffraction device and the focusing lens is set at a product f·k, and the focal length temperature coefficient $\beta$ and the distance coefficient k are set such that the focal length temperature coefficient $\beta$ and the predetermined temperature coefficient $\alpha_s$ approximately satisfy a relational expression $\beta=(\alpha_s/k)-\alpha\cdot(1/k-1)$.

According to this arrangement, as long as the temperature change of material making up the board of the optical wavelength identification apparatus, and material making up the light receiving device serving as an identification portion of an optical wavelength are determined, wavelength identification errors associated with temperature change can be corrected by adjusting the temperature change of the focal length of the focusing lens, and the distance between the optical diffraction device and the focusing lens, whereby identification of an optical wavelength can be performed with high precision.

Now, an arrangement may be made wherein the focal length temperature coefficient $\beta$ is set at zero, and the distance coefficient k is set such that the predetermined temperature coefficient $\alpha$ and the predetermined temperature coefficient $\alpha_s$ approximately satisfy $k=1-\alpha_s/\alpha$.

According to this arrangement, with the above optical wavelength identification apparatus, in the event of selecting a lens made up of a compound member commonly broadly employed regarding which the temperature coefficient $\beta$ is zero, the k that is a design parameter can be set as $k=1-\alpha_s/\alpha$ (however, $0<\alpha_s\leq\alpha$). In other words, a general purpose lens of $\beta=0$ can by employed, whereby reduction in cost can be anticipated.

Also, with the present invention, an arrangement may be made wherein the light receiving device comprises a PD array wherein PD cells for detecting light are disposed in one row with a predetermined interval on a light receiving surface of the PD array, and wavelengths of the light components are identified based on placement positions of the PD cells which have detected the light components entering the light receiving surface of the PD array.

According to this arrangement, the PD cells, i.e., photodiodes are disposed in one row, and the wavelength of the incident light can be identified on the placement position of the photodiode detecting incident light, and optical wavelength can be measured with high precision even when temperature changes by applying this arrangement to an optical wavelength measurement system employing a PD array.

Further, with the present invention, an arrangement may be made wherein the light receiving device is an MEMS wherein minute mirrors for reflecting light are disposed in one row on with a predetermined interval on a light receiving surface of the MEMS, and wavelengths of the light components are identified based on placement positions of the minute mirrors where the light components have entered.

According to this arrangement the wavelength of light entering from the placement position of the minute mirror where light has entered can be identified accurately event when temperature changes, and the MEMS can reflect the incident light in the direction corresponding to the identified wavelength thereof. In other words, with a wavelength selection apparatus employing the MEMS to which the wavelength identification apparatus of the present invention is applied, wavelength selection can be performed with high precision even when temperature changes.

Further, the wavelength identification apparatus of the present invention may be arranged so as to comprise a first focusing lens for focusing a plurality of lights to be entered via a fiber array; an optical diffraction device for dispersing each of the plurality of lights focused by the first focusing lens into light components by wavelength; a second focusing lens for focusing the dispersed light components; and a light receiving device for identifying wavelengths of the light components focused by the second focusing lens.

According to this arrangement, a PD array including multiple PD cell rows serving as light receiving means, or an MEMS including multiple minute mirror rows are employed, whereby a plurality of lights to be input via the fiber array can be dispersed at the same time, and the wavelengths thereof can be identified.

With an optical wavelength identification apparatus made up of optical diffraction device, a focusing lens, and light receiving device, which are fixed on the same board, the distance between the optical diffraction device and the focusing lens, and the coefficient of the focal length change of the focusing lens, which are adjustable design parameters, are adjusted, whereby correction can be performed with regard to the two factors of board expansion associated with temperature change, and the thermal expansion of the light receiving device itself, which are physical parameters that are determined beforehand and difficult to adjust, whereby optical wavelength identification can be performed with high precision while minimizing influence due to temperature change. Also, this optical wavelength identification apparatus is applied to an optical wavelength measurement system employing a PD array, and an optical wavelength selection switch employing an MEMS, whereby optical wavelength measurement with high precision, and optical wavelength selection switching with high precision can be performed even when temperature changes.

DESCRIPTION OF THE PREFERRED EMBODIMENTS

Figure 1:
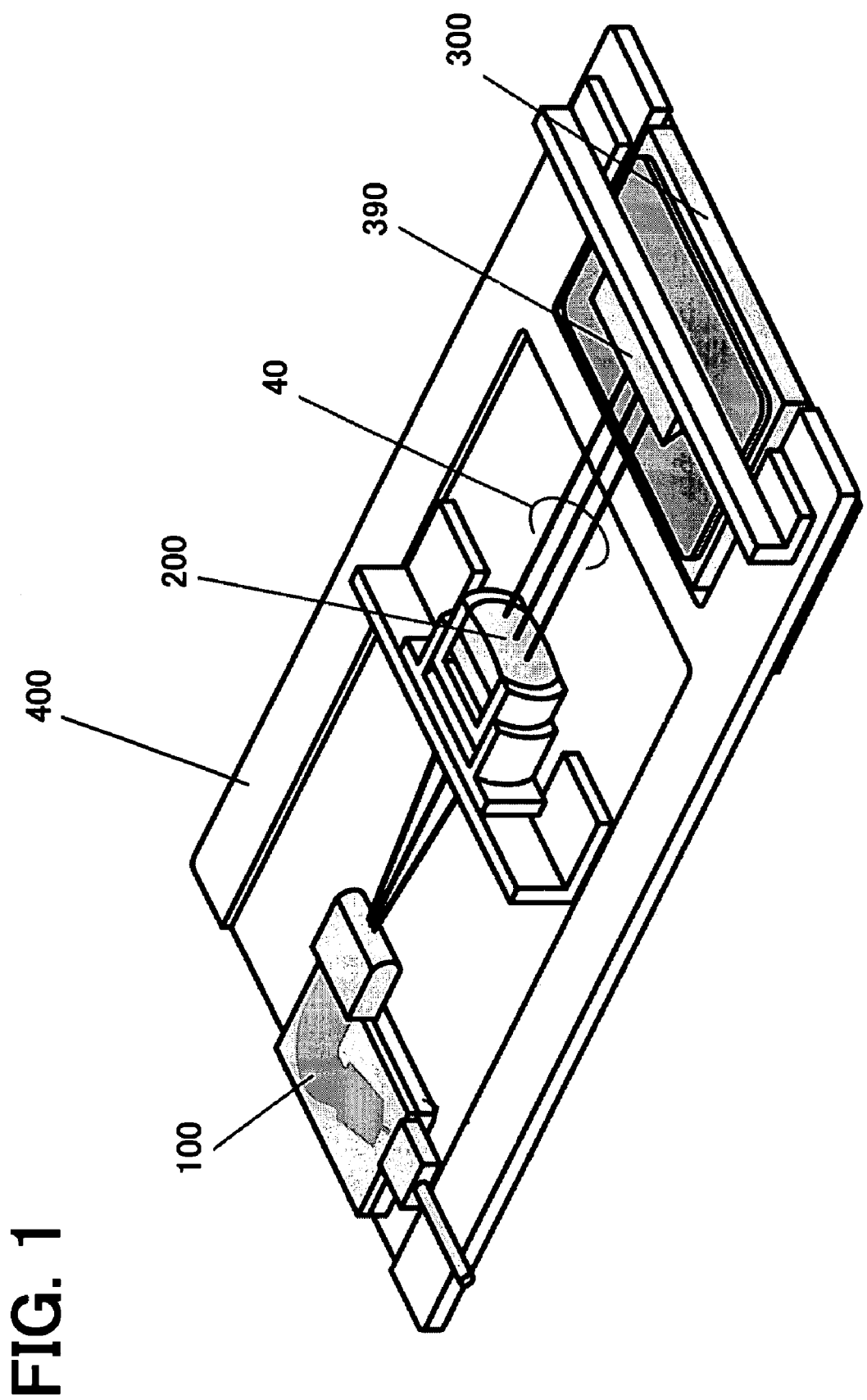
FIG. 1 is a diagram illustrating a configuration example of an optical wavelength detection system.
Figure 2:
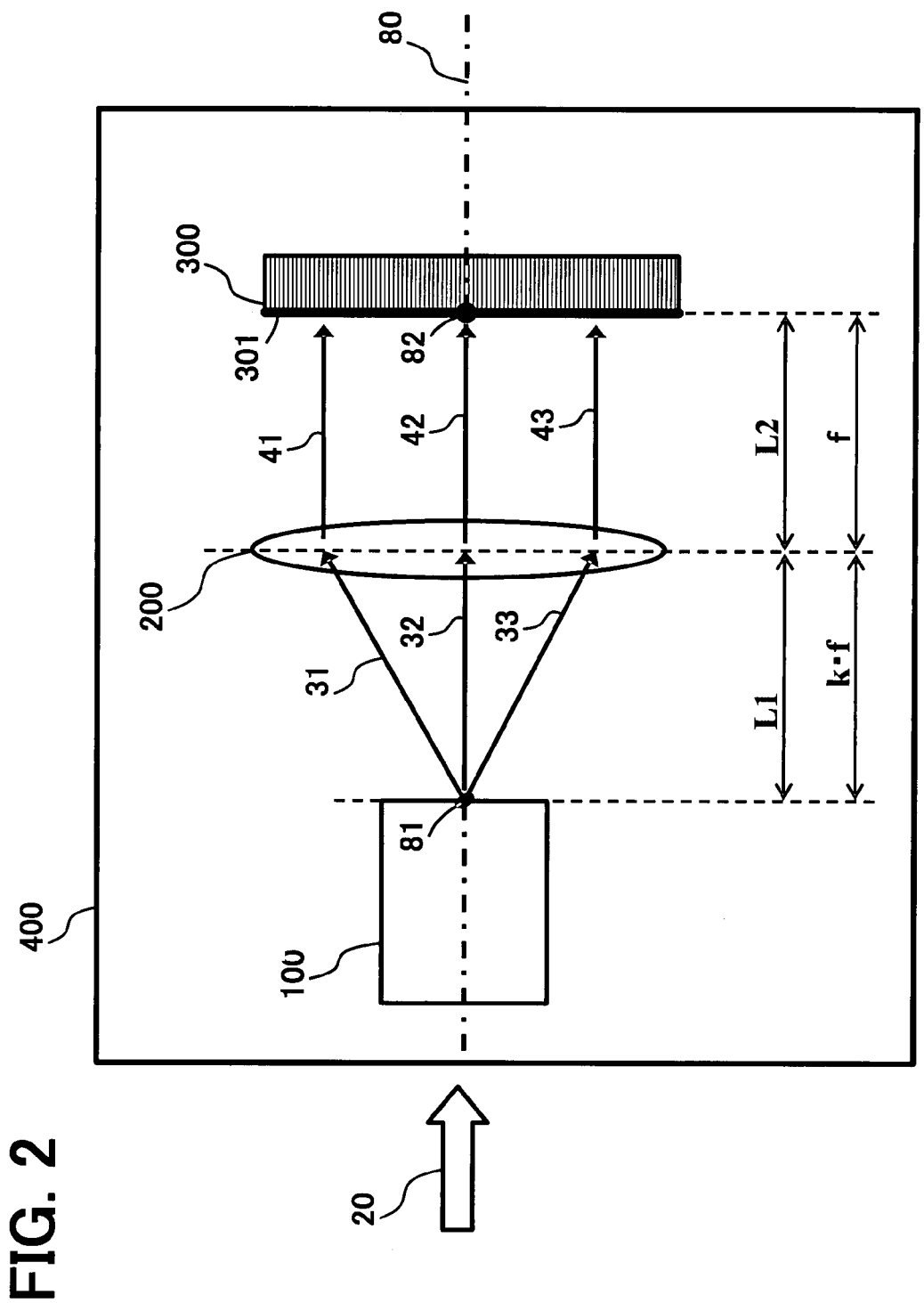
FIG. 2 is a diagram illustrating a first embodiment of a wavelength identification apparatus of the present invention.

FIG. 2 is a first embodiment of a wavelength identification apparatus of the present invention, and shows a conveyance status of light at the time of ordinary temperature thereof.

An optical diffraction device 100 serving as optical diffraction means, a focusing lens 200, and light receiving means are fixed on a board 400. If we say that the distance between the optical diffraction device 100 and the focusing lens 200 is "L1", the distance between the focusing lens 200 and the light receiving means 300 is "L2", and the focal length of the focusing lens 200 is "f", the optical diffraction device 100, a focusing lens 200, and light receiving means are disposed such that L1 is equal to f·k (wherein 0<k≦1) and L2 is equal to the focal length f of the focusing lens 200. Here, k is a distance coefficient for adjusting the distance between the optical diffraction device 100 and the focusing lens 200.

The optical diffraction device 100 disperses a light signal 20 including multiple wavelength components input thereto by wavelength components, and these wavelength components outgo from an originating point 81 disposed on an optical axis 80 of the focusing lens 200 to the focusing lens 200.

FIG. 2 schematically illustrates as a typical example a case wherein the incident light 20 is dispersed into three-wavelength light components 31, 32, and 33 for the sake of simplification of drawing expressions, but this can be applied to an arbitrary wavelength light component as well (the following description will be made with this understanding). The focusing lens 200 refracts the dispersed light components 31, 32, and 33 to focus these upon the light receiving surface 301 of the light receiving means 300 as light components 41, 42, and 43 respectively. Now, let us say that, of the light components to be dispersed by the optical diffraction device 100, short-wavelength light components are traveling toward the upper side of the focusing lens 200, and long-wavelength light components are traveling toward the lower side thereof.

Here, in the case of k=1, the focal length "f" of the focusing lens 200 is identical to the distance "L1" between the diffraction device 100 and the focusing lens 200, and the distance "L2" between the focusing lens 200 and the light receiving means 300, so the optical paths of the light components 41, 42, and 43 focused by the focusing lens 200 are parallel to the optical axis 80 of the focusing lens 200. The light components 41, 42, and 43 are irradiated perpendicular to the light receiving surface 301 of the light receiving means 300 disposed perpendicular to the optical axis 80, and converted into beam wastes upon the light receiving surface 301. FIG. 2 assumes this case of k=1, but in the case of 0<k<1, the optical paths of the light components 41 and 43 are not parallel to the optical axis 80 but in the expanded direction, and the positions on the light receiving surface 301 are the same as the case in FIG. 2, and also the light components 41 and 43 are not converted into beam wastes upon the light receiving surface 301, but the beam diameter is the same as the case in FIG. 2. In the following FIGS. 3, 4, and 5, the case of k=1 is illustrated as a typical example for the sake of simplification of drawing expressions, but the case of 0<k<1 also holds.

In the case in which the light receiving means 300 are a PD array, PD cells (photodiodes) for detecting light are arrayed with an equal interval to make up a PD cell row, and the wavelengths of incident light components are identified based on the positions on the light receiving surface 301 of the PD cells which detected light components entered in the light receiving surface 301.

Figure 3:
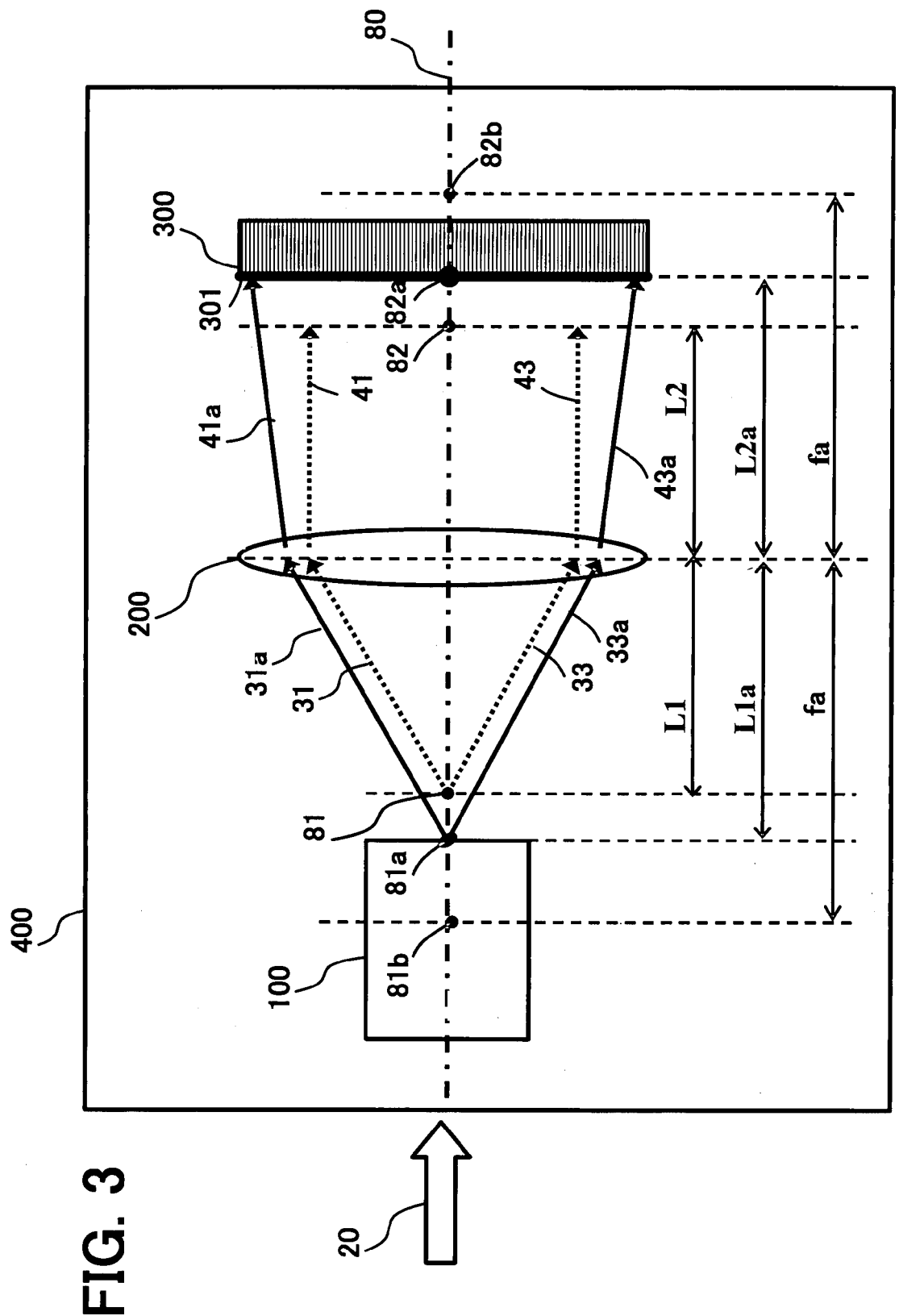
FIG. 3 is a diagram illustrating a conveyance status of light at the time of temperature changing according to the first embodiment of the present invention.

FIG. 3 illustrates a conveyance status of light at the time of temperature changing according to the first embodiment of the present invention. FIG. 3 illustrates a situation in a case wherein the optical paths of light components dispersed along with increase of temperature, the distance between the respective devices fixed on the board 400, and the focal length of the focusing lens change, centered on the focusing lens 200 (assuming that the position of the focusing lens 200 does not change).

The focal length "f" of the focusing lens 200 generally increases depending on the temperature change of a reflective index, and the thermal expansion of a glass material along with increase of temperature. On the other hand, the distance "L1" between the diffraction device 100 and the focusing lens 200, and the distance "L2" between the focusing lens 200 and the light receiving means 300 also increase, but FIG. 3 illustrates a case wherein increase in the focal length is greater than increase in "L1" and "L2". With regard to a case wherein increase in the focal length is smaller than the increase in "L1" and "L2", light beams 41*a* and 43*a* assume directions narrower than the light components 41 and 43, but here we will proceed with the analysis assuming that the situation in FIG. 3 is a typical example.

Also, of the optical paths of the light components 31, 32, and 33 dispersed at the optical diffraction device 100 at the time of ordinary temperature illustrated in the above FIG. 2, the optical paths of the light component 31 at the short wavelength side and the light component 33 at the long wavelength side are illustrated with dotted line arrows. With regard to the optical path of the light component 32 to be output along the optical axis 80, deviation of irradiation positions as to the light receiving surface 301 of the light receiving means 301 due to temperature change does not occur, and accordingly is not illustrated for the sake of simplification of the drawing.

The member of the board 400 fixing the optical diffraction device 100 and the focusing lens 200 disposed at the front side (toward the left side in FIG. 3) of the focusing lens 200 is subjected to thermal expansion, the distance between the optical diffraction device 100 and the focusing lens 200 increases, and the originating point 81 of light dispersed at the time of ordinary temperature moves to the originating point 81*a* of light to be dispersed following temperature changing.

Similarly, the member of the board 400 fixing the light receiving means 300 and the focusing lens 200 disposed at the rear side (toward the right side in FIG. 3) of the focusing lens 200 is subjected to thermal expansion, the distance between the focusing lens 200 and the light receiving means 300 increases, and the position of the light receiving surface 301 of the light receiving means 300 moves to the point 82*a* from the point 82 on the optical axis 80.

The focal length "f" of the focusing lens 200 also increases to "fa", and the front-side focal point of the focusing lens 200 moves from the point 81 of the optical axis 80 to the 82*b*.

FIG. 3 illustrates a case wherein increase in the focal length is greater than thermal expansion of the member at one side of the focusing lens 200 of the board 400. Accordingly, the originating point 81*a* of the light component to be dispersed from the optical diffraction device 100 following increase in temperature is positioned closer to the focusing lens 200 than the front-side focal point 81*b* of the focusing lens 200, so the optical paths of the light components 41a and 43a focused at the focusing lens 200 are not parallel to the optical axis 80, and are expanded outside as viewed from the optical axis 80, the irradiation position as to the light receiving surface 301 of the light receiving means 300 is shifted outside as viewed from the center 82a of the light receiving surface 301, and consequently, a great error occurs regarding identification of a wavelength at the light receiving means 300.

Figure 4:
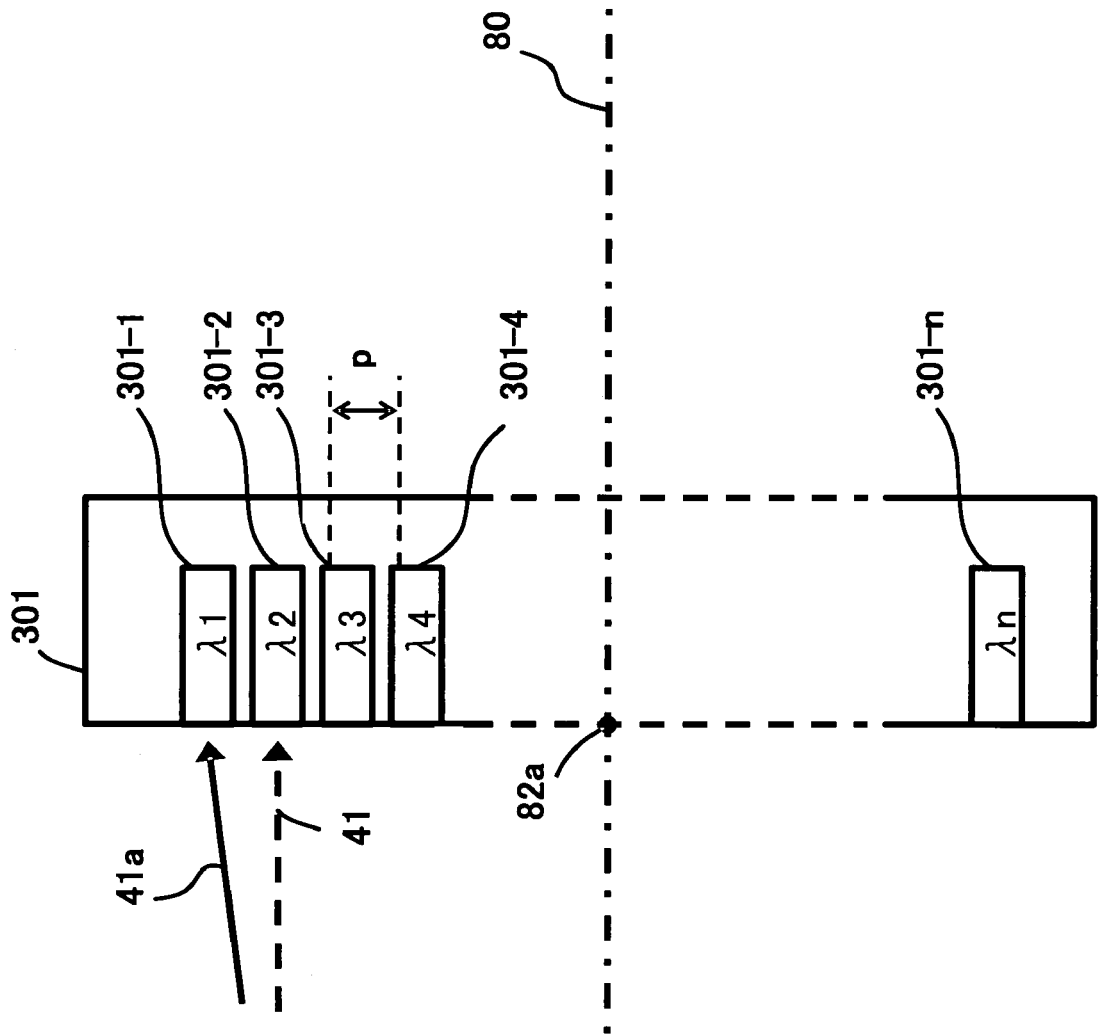
FIG. 4 is an overview of a PD array employed as light receiving means according to the present invention.

FIG. 4 is an overview of the PD array employed as the light receiving means of the present invention, and schematically illustrates the configuration of the light receiving surface 301 in the case of employing the PD array as the light receiving means 300.

Multiple PD cells are arrayed in one row with an equal interval to make up a PD cell row on the light receiving surface 301 of the PD array 300. The example shown in FIG. 4 illustrates a situation wherein n PD cells 301-1 through 301-n are arrayed with an interval of "P". With each of the photodiodes, the wavelength of a light component to be received is determined depending on the placement position thereof beforehand, for example, the 301-1 identifies the light component having the longest wavelength, and the wavelength to be identified becomes longer in the sequence of 301-2, 3, and 4, and the 301-n identifies the longest wavelength. With the example shown in FIG. 4, the PD cells 301-1, 2, 3, and so on through n are disposed so as to identify the light components of "λ1", "λ2", "λ3", and so on through "λn" respectively. For example, in the case of the light component 41 (dotted line arrow) entering into the PD cell 301-2, the PD array 300 identifies that the wavelength of the light component 41 is "λ2".

However, as described in the above FIG. 3, at the time of increase in temperature, the optical path of the light component having the same wavelength as "λ2" is moved outside from the center of the light receiving surface 301 as shown in 41a (solid line arrow), and may be irradiated, for example, at the position of the PD cell 301-1 in some cases. In this case, the PD array 300 identifies that the light component having the wavelength "λ1" is received, and consequently, misidentifies that the light component having the wavelength "λ2" actually entered is taken as the wavelength "λ1".

Figure 5:
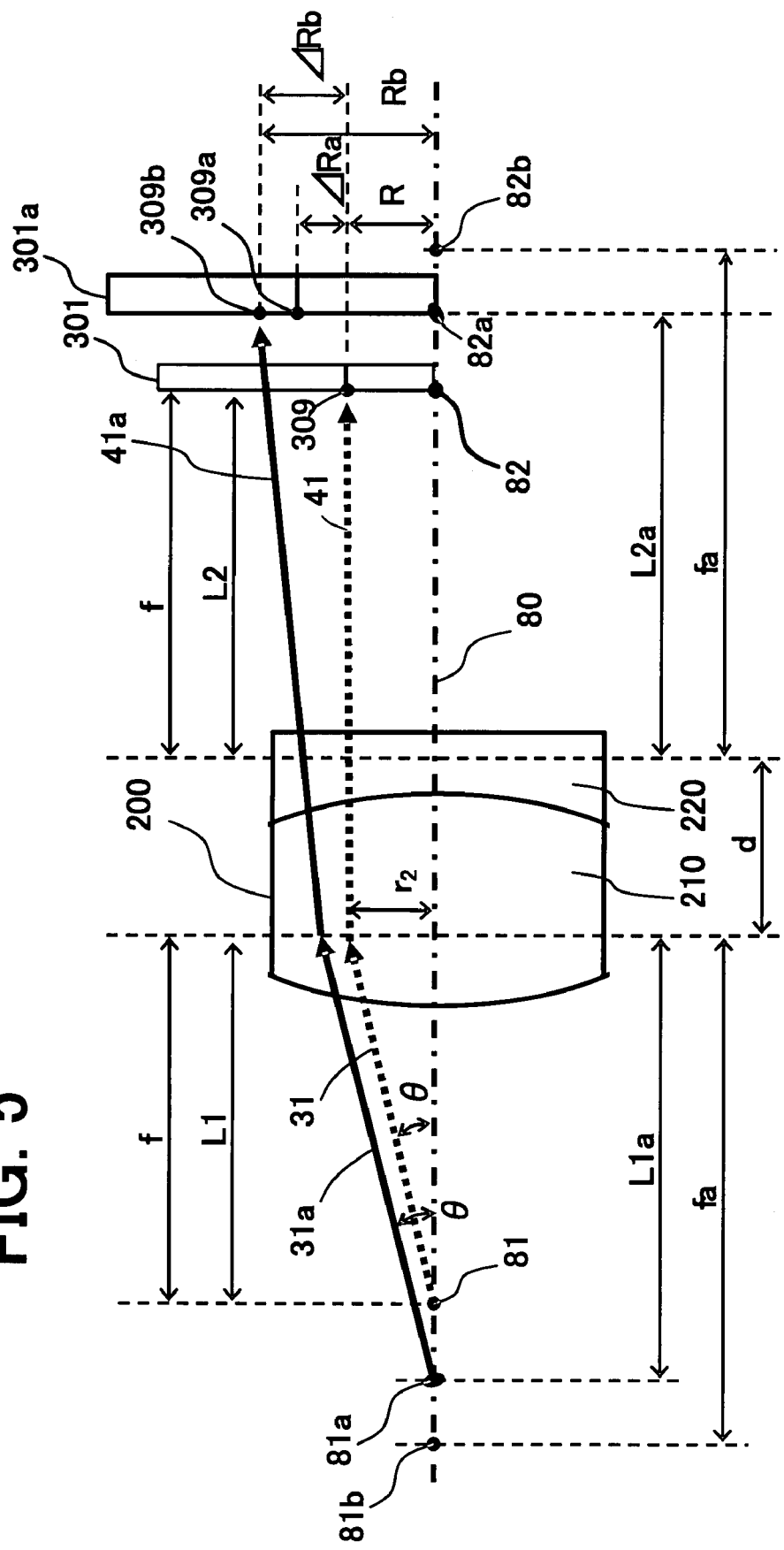
FIG. 5 is a diagram illustrating identification errors of light components entering into the light receiving means at the time of temperature changing.

FIG. 5 illustrates the identification errors of a light component to be entered into the light receiving means at the time of temperature changing.

The light component of an optical path 31 (dotted line arrow) outgoing in the direction of an angle "θ" as to the optical axis 80 from the position of the focal point 81 of the front side of the focusing lens 200 is refracted at the focusing lens 200, and reaches the light receiving surface 301 of the light receiving means 300 via an optical path 41 (dotted line arrow). At this time, the optical path 41 is parallel to the optical axis 80, i.e., perpendicular to the light receiving surface 301, and light enters at a point 309 on the light receiving surface at a distance "R" from the center 82 of the light receiving surface 301. Here, only the upper half of the optical axis 80 of the light receiving surface 301 is illustrated for the sake of simplification of the drawing. Also, the focusing lens 200 has, for example, the configuration of a compound lens for performing correction of chromatic aberration by combining a convex lens 210 and a concave lens 220.

Next, at the time of increase in temperature, the focal length "f" of the focusing lens changes depending on the temperature change of a reflective index, and the thermal expansion of a glass material, and increases to "fa". On the other hand, the distance "L1" between the diffraction device 100 and the focusing lens 200, and the distance "L2" between the focusing lens 200 and the light receiving means 300 also increase, but here illustrates a case wherein increase in the focal length is greater than increase in "L1" and "L2".

Accordingly, the origin of the light component dispersed at the optical diffraction device 100 following increase in temperature is moved to the 81a, but assumes an origin closer to the focusing lens 200 as to the focal point 81b of the front side of the focusing lens following increase in temperature, so the light component 31a dispersed (solid line arrow) traces the optical path of the 41a (solid line arrow) outer side than the 41 following refraction by the focusing lens 200. Subsequently, the light component 31a enters a point 309b on the light receiving surface 301a of the light receiving means 300 following movement due to increase in temperature. That is to say, as viewed from above the light receiving surface 301 of the light receiving means 300, the incident position at the time of ordinary temperature is the distance "R" from the center of the light receiving surface 301, but following increase in temperature, the incident position is shifted to a distance "$R_b$" ("$R+\Delta R_b$") from the center of the light receiving surface 301.

On the other hand, the light receiving means 300 itself is subjected to thermal expansion due to the component member thereof, and the incident position 309 of the light component 41 at the time of ordinary temperature is moved to a point 309a following increase in temperature. In other words, the distance from the light receiving surface center increases from "R" to "$R+\Delta R_a$". This appears as if the incident position of the light component is shifted in the direction of the optical axis 80 by "$\Delta R_a$" in the case of viewing with the PD cell, which has received the light component, as a reference.

Accordingly, if we say that the identification errors at the incident position of the light component 41a are "Δx" with the center 82a of the light receiving surface 301 of the light receiving means 300 along with increase in temperature, it can be understood that $$\Delta_x = \Delta_{R_b} - \Delta_{R_a} \quad \text{(Expression—1)}$$

holds.

The above relational expression holds even in the case of decrease in temperature as well, if we say that the value of shift toward the outer side direction from the center of the light receiving surface 301 is represented with a positive sign, and the value shift toward the center direction is represented with a negative sign.

Figure 6:
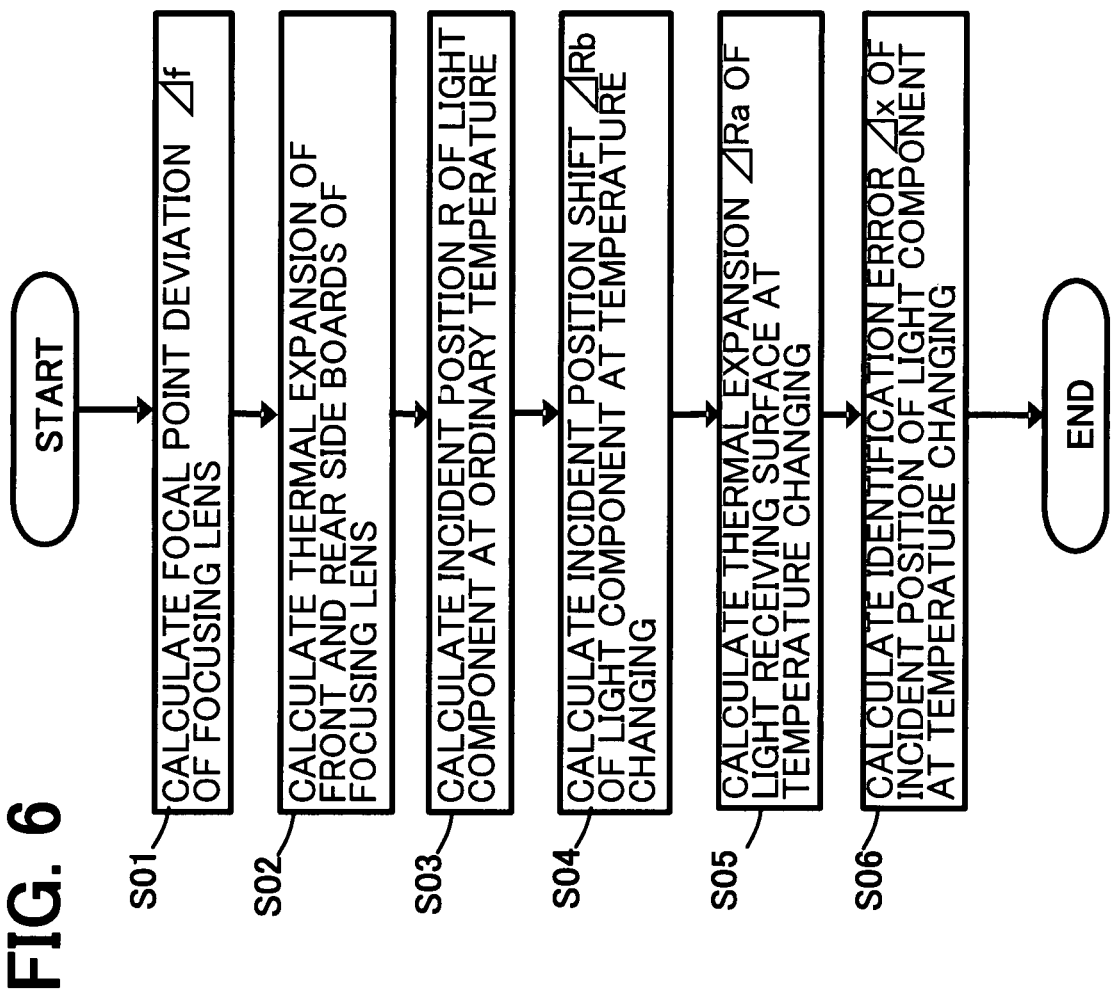
FIG. 6 is a diagram illustrating a calculation method of wavelength identification errors according to the present invention.

FIG. 6 is the calculation method of wavelength identification errors according to the present invention, and description will be made in the sequence of calculation steps thereof with reference to the above FIG. 5.

S01: Calculates the focal point deviation "Δf" of the focusing lens 200 at the time of temperature changing.

If we say that the temperature change from the ordinary temperature is taken as "ΔT", and the focal length change coefficient of the focusing lens 200 is taken as "β", the value of the focal point deviation "Δf" of the focusing lens 200 is $$\Delta_f = \pm f \beta \cdot \Delta_T \quad \text{(Expression—2)}$$

Here, plus means that the focal length increases along with increase in temperature, and minus means the reverse thereof. This is not a physical constant, and accordingly can have both values of plus and minus.

S02: Calculate the thermal expansion "ΔL1" of the front side board of the focusing lens 200 at the time of temperature changing, and the thermal expansion "ΔL2" of the rear side board.

If we say that the temperature coefficient of the material of the board is "α", the thermal expansion "ΔL1" of the front side board of the focusing lens 200 at the time of temperature changing is "L1=k·f", and accordingly, $$\Delta_{L1} = \alpha \cdot k \cdot f \cdot \Delta_T \quad \text{(Expression—3)}$$

holds.

As for the thermal expansion "ΔL2" of the rear side board, the rear side is made of the same board material as the front side, and also "L2=f" holds, and accordingly, $$\Delta_{L2} = \alpha \cdot f \cdot \Delta_T \quad \text{(Expression—4)}$$

holds.

S03: Calculate the incident position "R" of the light component to the light receiving surface of the light receiving means, at the time of the ordinary temperature.

First, the following Expression 5 can be obtained by employing a known beam matrix analytical method. The beam matrix analytical method is described in a document "OPTICS" (written by Eugene Hecht, Chapter 6 of the fourth edition), for example.

$$R = \left(1 - \frac{L_2}{f}\right) \cdot r_1 + \left(L_1 + L_2 - \frac{L_1 \cdot L_2}{f}\right) \cdot r_2 \quad \text{(Expression—5)}$$

With the above Expression 5, "$r_1$" denotes a height as to the optical axis 80 of the originating point 81 of the light component 31, and "$r_2$" denotes a height as to the optical axis 80 in the position of the focusing lens 200 of the light component 31. With the above case in FIG. 5, "$r_1$=0", and if we substitute these in Expression 5, $$R = f \cdot r_2 = f \cdot \tan\theta \quad \text{(Expressio—6)}$$

can be obtained.

S04: Calculate the incident position shift "$\Delta R_b$" of the light component at the time of temperature changing.

When temperature changes from the ordinary temperature "T0" to "T0+ΔT" by temperature changing only "ΔT", if we say that the change value of the focal length f of the focusing lens 200 is "Δf", the focal length $f_a$ following temperature changing is "f+Δf", the L1 following temperature changing is $L1_a$=(f+ΔL)·k, and the L2 following temperature changing is $L2_a$=f+ΔL, and accordingly, the distance $R_b$ from the optical axis 80 of the light receiving surface 301 of the light receiving means 300 following temperature changing is $$R_b = \left(f \cdot (1+k) + \Delta L \cdot (1+k) - \frac{(f+\Delta L)^2 \cdot k}{f+\Delta f}\right) \cdot \tan\theta \quad \text{(Expression—7)}$$

$$\approx \left(\frac{f + \Delta L \cdot (1-k) + \Delta f \cdot (1+k) + \Delta L \cdot (1+k) \cdot \Delta f / f - k \cdot \Delta L^2 / f}{1 + \Delta f / f}\right) \cdot \tan\theta \quad \ldots$$

According to the above Expression 6 and Expression 7, $$\Delta R_b = R_b - R \quad \text{(Expression—8)}$$

$$= \left(\frac{\Delta L \cdot (1-k) + \Delta f \cdot k + \Delta L \cdot (1+k) \cdot \Delta f / f - k \cdot \Delta L^2 / f}{1 + \frac{\Delta f}{f}}\right) \cdot \tan\theta$$

$$\approx (\Delta f \cdot k + \Delta L \cdot (1-k)) \cdot \tan\theta$$

is obtained, and if we substitute Expression 2, Expression 3, and Expression 4 therein, $$\Delta R_b = \left\{\frac{f \cdot \Delta T \cdot \{\beta \cdot k + \alpha \cdot (1-k) + \alpha \cdot \Delta T \cdot (\beta \cdot (1+k) - \alpha \cdot k)\}}{1 + \beta \cdot \Delta T}\right\} \cdot \tan\theta \quad \text{(Expression—9)}$$

$$\approx f \cdot \tan\theta \cdot \Delta T \cdot (\beta \cdot k + \alpha \cdot (1-k))$$

is obtained.

S05: Calculate the thermal expansion "$\Delta R_a$" of the light receiving surface 301 of the light receiving means 300 at the time of temperature changing.

The light receiving surface 301 of the light receiving means 300 becomes long due to thermal expansion, and the PD cell irradiated by a light component is moved toward the outer direction of the optical axis 80. That is to say, the PD cell at the position 309 on the light receiving surface 301 which the light component enters at the time of the ordinary temperature is moved to the incident position 309a due to temperature change. If we say that the thermal linear expansion coefficient of the light receiving means 300 is "$\alpha_s$", the change value "$\Delta R_a$" toward the outer side from the optical axis 80 on the light receiving surface 301 of the relevant PD cell at that time is as follows.

$$\Delta_{R_a} = R \cdot \alpha_s \cdot \Delta_T = f \cdot \tan\theta \cdot \alpha_s \cdot \Delta_T \quad \text{(Expression—10)}$$

S06: Calculate the identification error "Δx" of the incident position of the light component at the time of temperature changing.

The incident position identification error "Δx" at the time of the light component entering into the light receiving surface 301 of the light receiving means 300 when temperature changes is a value obtained by subtracting the change value "$\Delta R_a$" due to the thermal expansion of the light receiving surface 301 from the value of incident position deviation "$\Delta R_b$" of the light component such as shown in Expression 1, so that $$\Delta_x = \Delta_{R_b} - \Delta_{R_a} = f \cdot \tan\theta \cdot \Delta_T \cdot (\beta \cdot k + \alpha \cdot (1-k) - \alpha_s) \quad \text{(Expression—11)}$$

is obtained.

According to the above Expression 11, it can be understood that it is necessary regarding temperature change to take the thermal expansion of the light receiving means itself into consideration, and this thermal expansion is determined by the four factors of the focal length temperature coefficient "β" of the focusing lens, the temperature coefficient "α" of the distances between the focusing lens and the diffraction device due to the thermal expansion of the material of the board, and between the focusing lens and the light receiving means, the position change coefficient "$\alpha_s$" of the PD cell due to the expansion of the light receiving means, and the distance coefficient k as to the focal length f between the focusing lens and the diffraction device.

Accordingly, in order to realize athermalizing (temperature independency), it is necessary to set Δx=0, and it can be understood that so as to satisfy $$\beta = \alpha_s / k - \alpha \cdot (1/k - 1)(0 < k \leq 1) \quad \text{(Expression—12)}$$

the values of α, $\alpha_s$, β, and k need to be adjusted.

Spherical aberrations, chromatic aberrations, and so forth can be improved by employing a compound lens (double, triplet, or the like) serving as the focusing lens, and also the temperature coefficient β of the focal length can be set to zero, plus (increase along with increase in temperature), or minus.

Also, when employing a common lens which is designed with the focal length change coefficient β=0, an optical system needs to be designed so as to satisfy $$k = 1 - \alpha_s/\alpha \text{(wherein } 0 < \alpha_s < \alpha\text{)}.$$

For example, with the focal length of 40 mm, tan θ=0.06 rad, ΔT=30° C., if we say that β=8×10$^{-6}$, α=5.3×10$^{-6}$, αs=4.8×10$^{-6}$, and k=0.5 without correcting the wavelength identification errors, $$x = 40 \times 10^{-3} \times 30 \times (8 \times 10^{-6} \times 0.5 + 5.3 \times 10^{-6} \times 0.5 - 4.8 \times 10^{-6}) \times 0.06 = 130 \text{ nm}$$

is obtained according to Expression 1, resulting in a great wavelength identification error.

On the other hand, in order to obtain the wavelength identification error Δx=10 pm with the above same parameters, it can be understood that β should be set to 4.3×10$^{-6}$ by employing the result of Expression 11, whereby wavelength identification precision can be controlled appropriately.

Figure 7:
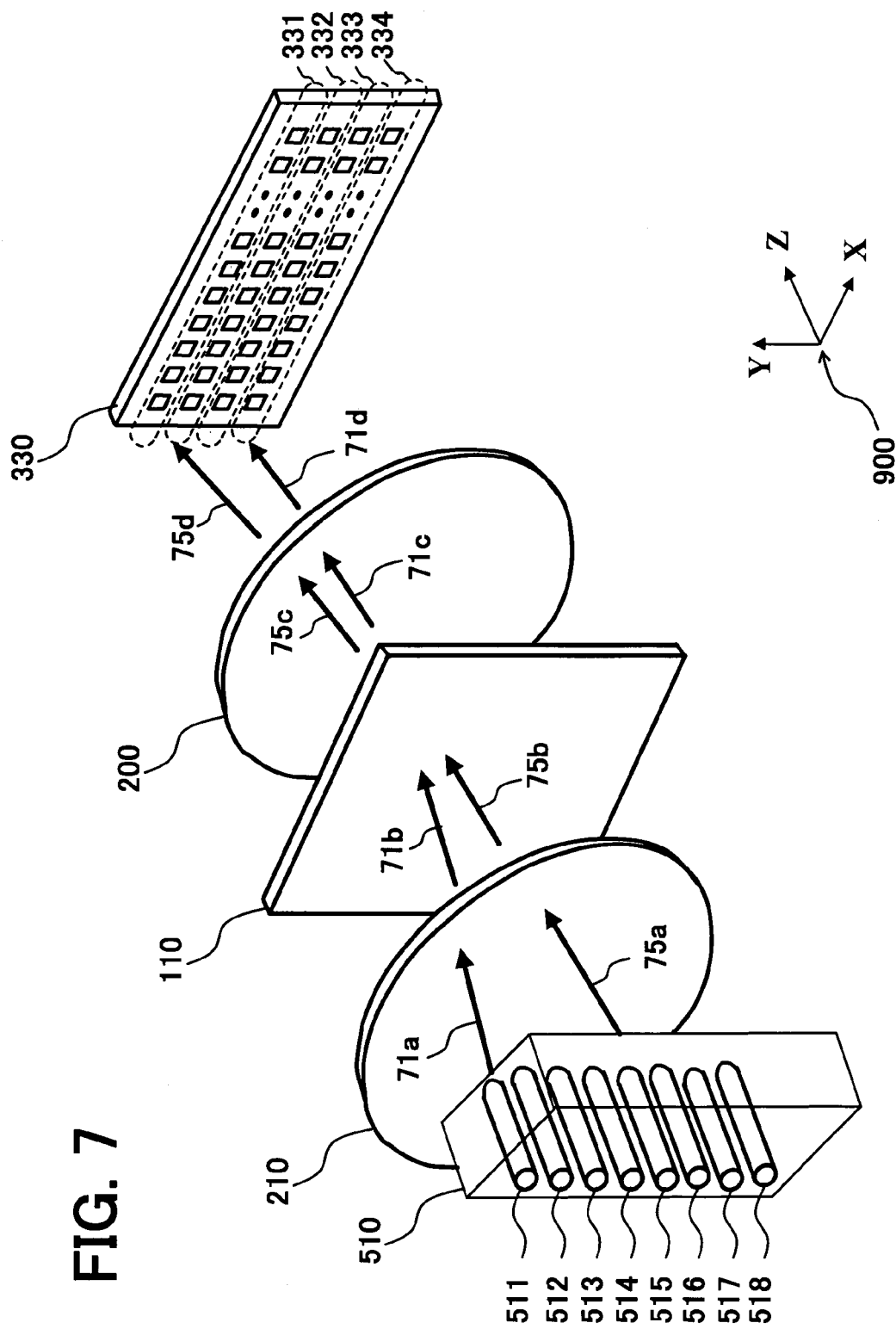
FIG. 7 is a diagram illustrating a second embodiment of a wavelength identification apparatus of the present invention.

FIG. 7 illustrates the configuration wherein wavelength identification can be performed regarding a plurality of lights entering at the same time, according to the second embodiment of the wavelength identification apparatus of the present invention.

Now, description will be made with reference to two side views in FIG. 8 and FIG. 9 to explain the configuration illustrated in FIG. 7 in a simplified manner.

With the second embodiment illustrated in FIG. 7, a PD array made up of multiple PD cell rows serving as light receiving means is employed. The embodiment in the case of a PD array 330 including four PD cell rows 331, 332, 333, and 334 is illustrated here.

In the event that the PD array serving as the light receiving means includes only one PD cell row, the number of beams to be input into a diffraction grating 110 serving as optical diffraction means is restricted to one, but in the event that there are multiple PD cell rows, beams of a number equivalent to the maximum number of PD cell rows can be entered into the diffraction grating 110 simultaneously to identify and measure the wavelength of each of the beams simultaneously. Therefore, in addition to the focusing lens 200 employed for the first embodiment of the present invention illustrated in FIG. 2, a focusing lens 210 for focusing the multiple beams input via a fiber array 510 to the diffraction grating 110 is disposed between the fiber array 510 and the diffraction grating 110. In order to distinguish between the focusing lens 210 and the focusing lens 200 employed for the first embodiment of the present invention illustrated in FIG. 2, the focusing lens 210 will be called a first focusing lens, and the focusing lens 200 employed for the first embodiment of the present invention will be called a second focusing lens.

The multiple beams focused by the first focusing lens 120 and input to the diffraction grating 110 are dispersed into light components by wavelength by the diffraction grating 110. Subsequently, each of the light components is entered into the corresponding PD cell row on the PD array 330 by the second focusing lens 200.

The embodiment in FIG. 7 illustrates a situation wherein of eight fibers 511 through 518 arrayed in the Y-axis direction of the fiber array 510, beams 71a and 75a entered via the fibers 511 and 515 reach the PD array 330 respectively. An example in the case of configuring the beam 71a entered from the fiber 511 of the fiber array 510 so as to correspond to the PD cell row 334 of the PD array 330, and the beam 75a entered from the fiber 515 so as to correspond to the PD cell row 332 of the PD array 330 is illustrated here.

The beam 71a which has entered via the fiber 511 is focused by the first focusing lens 210 and input into the diffraction grating 110 as a beam 71b. Following passing through the diffraction grating 110, the beam 71b is dispersed into respective wavelength components, and input into the second focusing lens 200 as a beam 71c. Subsequently, the beam 71c is focused into the corresponding PD cell row 334 of the PD array 330 as a beam 71d, and the wavelength of each light component is measured.

As for the beam 75a which has entered via the fiber 515 as well, the beam 75a is input into the diffraction grating 110 via the first focusing lens 210 as a beam 75b. The beam 75b is dispersed into respective wavelength components via the diffraction grating 110 and input into the second focusing lens 200 as a beam 75c, and further, focused into the corresponding PD cell row 332 of the PD array 330 as a beam 75d, and the wavelength of each light component is measured. Thus, with regard to the beams 71a and 75a which have entered from the fiber array 510, the wavelength components thereof can be simultaneously measured by the PD array 330.

Figure 8:
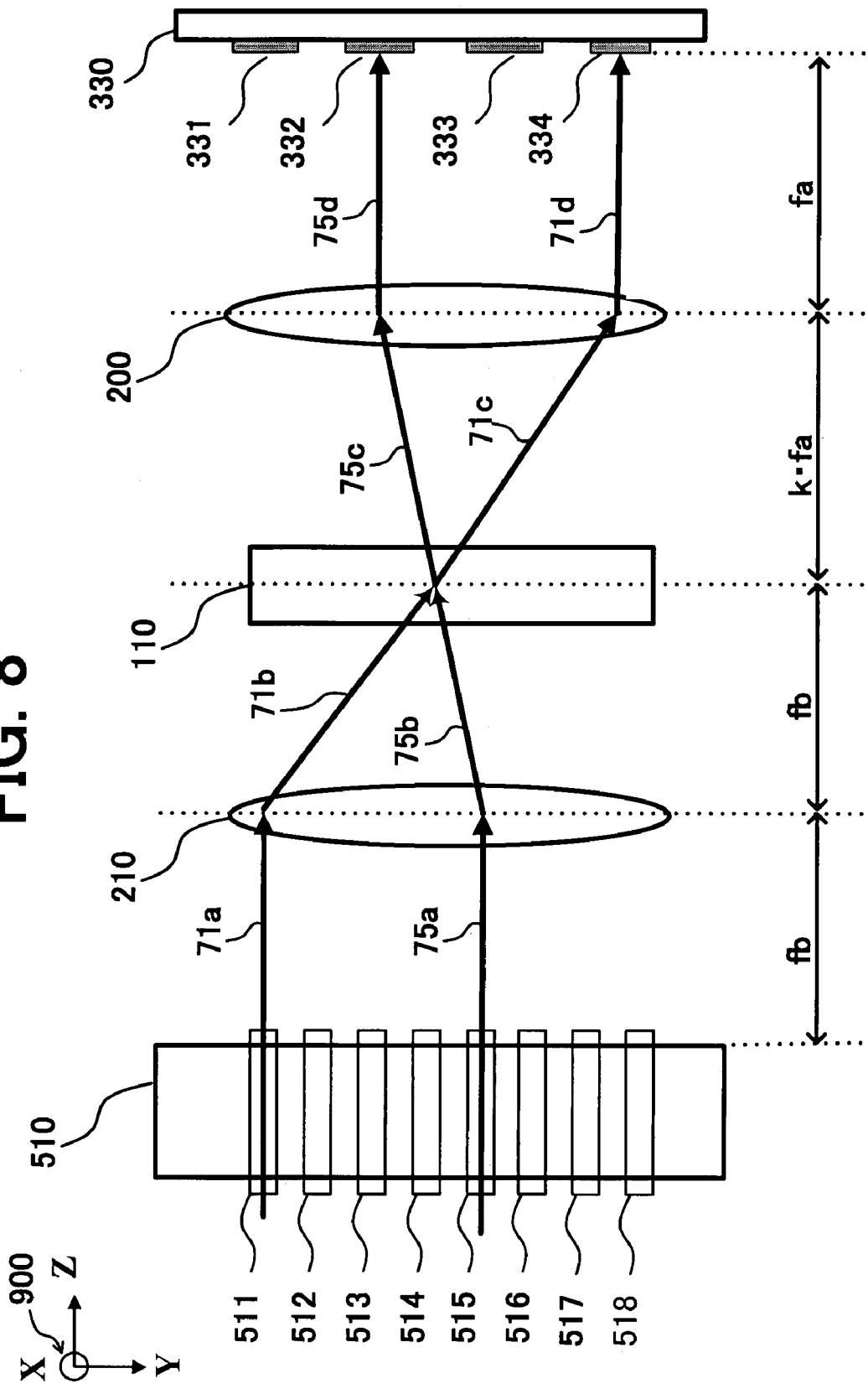
FIG. 8 is a first side view for describing the second embodiment of the wavelength identification apparatus of the present invention.

FIG. 8 illustrates this situation using a side view illustrating the configuration example in FIG. 7 with reference numeral 900 as viewed from the X direction of the coordinate axis. The beams 71a and 75a which have entered via the fibers 511 and 515 are focused into the diffraction grating 110 by the first focusing lens 210 as beams 71b and 75b, and dispersed into beams 71c and 75c respectively. Subsequently, the beams 71c and 75c are further focused by the second focusing lens 200 as beams 71d and 75d, input into the corresponding PD cell rows 334 and 332 of the PD array 300, and received by the PD cells, whereby each of the wavelengths is measured. The dispersed light components 71c, 75c, and 71d, 75d actually expand on the X-Z plane and enter into the PD cell 330, but with the present drawing, these are overlapped and represented with one straight line.

Thus, an arrangement has been made wherein of the fibers arrayed in the Y-axis direction in the fiber cell 510, certain fibers are correlated with PD cell rows arrayed in the PD array 330 beforehand, each wavelength component entered from the certain fibers is received at the certain PD cell rows within the PD array 330, whereby the wavelengths of beams entering from the multiple fibers of the fiber array 510 can be identified simultaneously.

Figure 9:
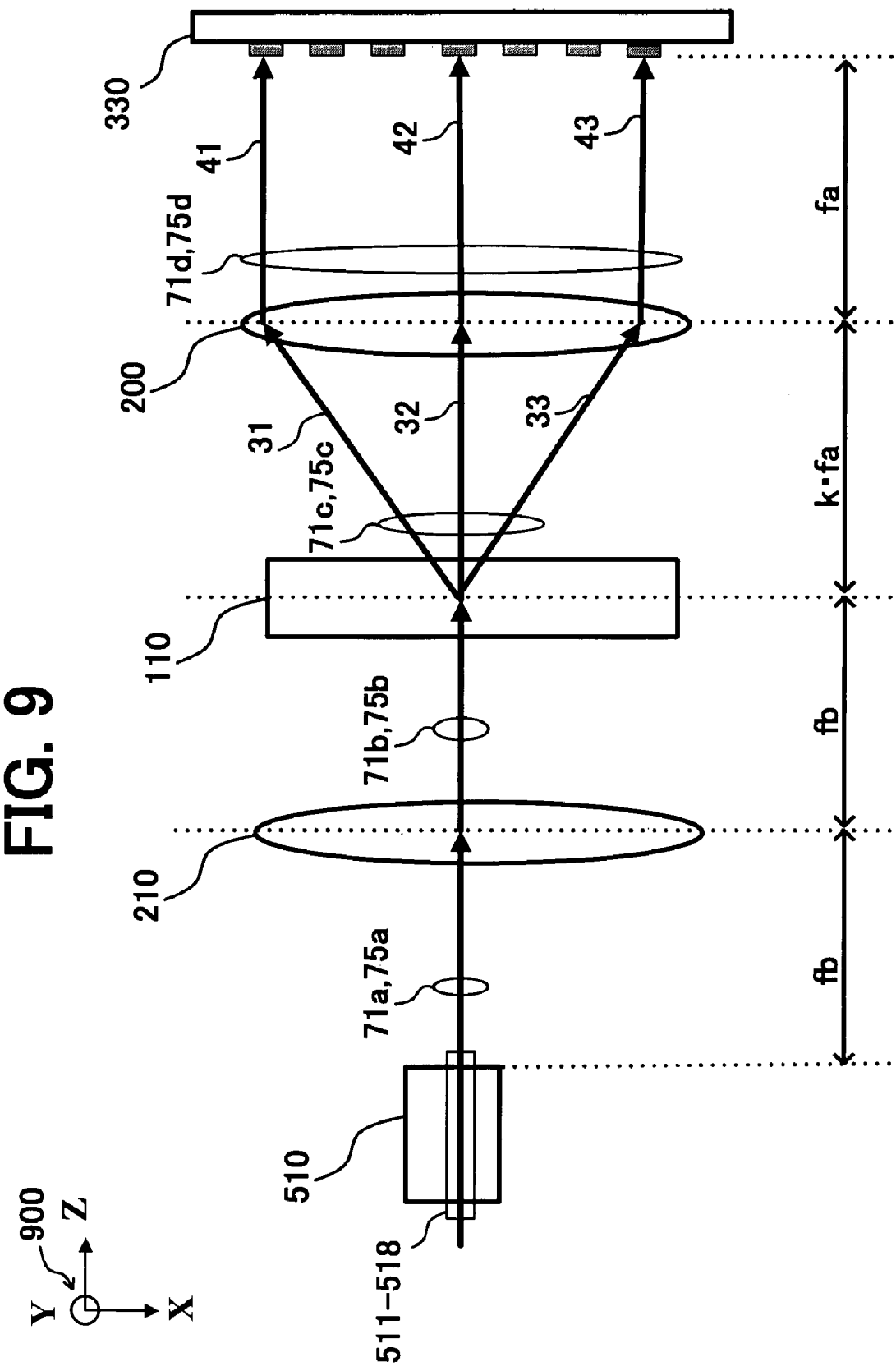
FIG. 9 is a second side view for describing the second embodiment of the wavelength identification apparatus of the present invention.

FIG. 9 is a side view of the configuration of the second embodiment illustrated in FIG. 7 as viewed from the Y direction of the coordinate axis shown with reference numeral 900 in FIG. 7.

The beams 71a and 75a which have entered via the fibers 511 and 515 of the fiber array 510 enter into the diffraction grating 110 via the first focusing lens 210 as beams 71b and 75b. Subsequently, the beams 71b and 75b are dispersed into such as beams 31, 32, and 33 for example by the diffraction grating 110 and input into the second focusing lens 200, and then into the corresponding PD cell rows of the PD array 330 as beams 41, 42, and 43, and the wavelengths of the beams 41, 42, and 43 are measured. FIG. 9 is a cross-sectional view of FIG. 7 as viewed from the Y-axis direction, so the two beams 71a and 75a are combined and illustrated with one arrow, and with regard to the PD cell rows also, only one PD cell row is shown. Also, with regard to the light components 31, 32, 33, 41, 42, and 43 following the two beams 71a and 75a being dispersed, each is represented with one arrow, but actually, each of the light components corresponding to the beams 71a and 75a is received by a different PD cell row on the PD array 330. With the present drawing, only one PD cell row is described since the different PD cell rows are viewed in an overlapped manner.

In the event of employing the conventional technology, correction can be made regarding the change caused by the expansion of the board material due to temperature change, and the focal length change of the focusing lens, but the expansion due to the temperature change of the material of the PD array for detecting light components, and the thermal expansion of the glass material making up the fiber array are not taken into consideration. In other words, with the conventional correction methods, it is necessary to employ a material capable of matching the focal length change of the first lens due to temperature, and the amount of change due to the thermal expansion of the material of the board fixing between the diffraction device and the first focusing lens, and between the first focusing lens and the fiber array, and also matching the focal length change of the second lens due to temperature, and the amount of change due to the thermal expansion of the material of the board fixing between the diffraction device and the second focusing lens, and between the second focusing lens and the PD array, or alternatively, a material capable of approximating the focal length change of the first lens and the second lens to zero as much as possible, and also approximating the thermal expansion of the member to zero as much as possible. However, it is difficult to completely suppress the identification errors of optical wavelengths due to temperature change since the thermal expansion of the PD array itself, and the thermal expansion of the fiber array itself are not taken into consideration.

The placement relations between the diffraction grating 110, the second focusing lens 200, and the PD array 330 are the same as the placement relations between the diffraction means 100, the focusing lens 200, and the light receiving means 300 shown in the first embodiment in FIG. 2. That is to say, if we say that the focal distance of the second focusing lens 200 is "$f_a$", the distance between the diffraction grating 110 and the second focusing lens 200 is taken as "$k \cdot f_a$", and the distance between the second focusing lens 200 and the PD array 330 is taken as "$f_a$", the same as the contents described with FIGS. 3, 5, and 6 can be said regarding the placement relations, and wavelength identification errors at the time of temperature changing. Accordingly, in order to realize athermalizing, design should be made by adjusting α, $α_s$, β, and k so as to satisfy $β=(α_s/k)-α(1/k-1)$ (wherein $0<k≦1$).

Also, with the above second embodiment of the present invention, as can be understood from the cross-sectional view in FIG. 8, in order to correlate multiple beams entering from the fiber array 510 with the multiple PD cell rows of the PD array 330, it is necessary to convert the multiple beams entering in parallel from the fiber array 510 into beam wastes on the surface of the diffraction grating 110, and accordingly, the distance between the fiber array 510 and the first focusing lens 210, and the distance between the first focusing lens 210 and the diffraction grating 110 are both configured as the focal length "$f_b$" of the first focusing lens 210. Now, if we consider that the relations between the fiber array 510, the first focusing lens 210, and the diffraction grating 110, is equivalent to the relations between the light receiving means 300, the focusing lens 200, and diffraction means 100 according to the first embodiment of the present invention, it should be conceived that with the above Expression 12, β is the temperature coefficient of the focal length of the first focusing lens, and $α_s$ is the thermal linear expansion coefficient of the glass material making up the fiber array 510. Subsequently, since the distance between the fiber array 510 and the first focusing lens 210, and the distance between the first focusing lens 210 and the diffraction grating 110 are both equal to the focal length "$f_b$" of the first focusing lens 210, it can be conceived that with the above Expression 12, k=1 holds, and accordingly, in order to realize athermalizing, the apparatus should be configured by adjusting $α_s$ and β so as to satisfy $β=α_s$.

Figure 10:
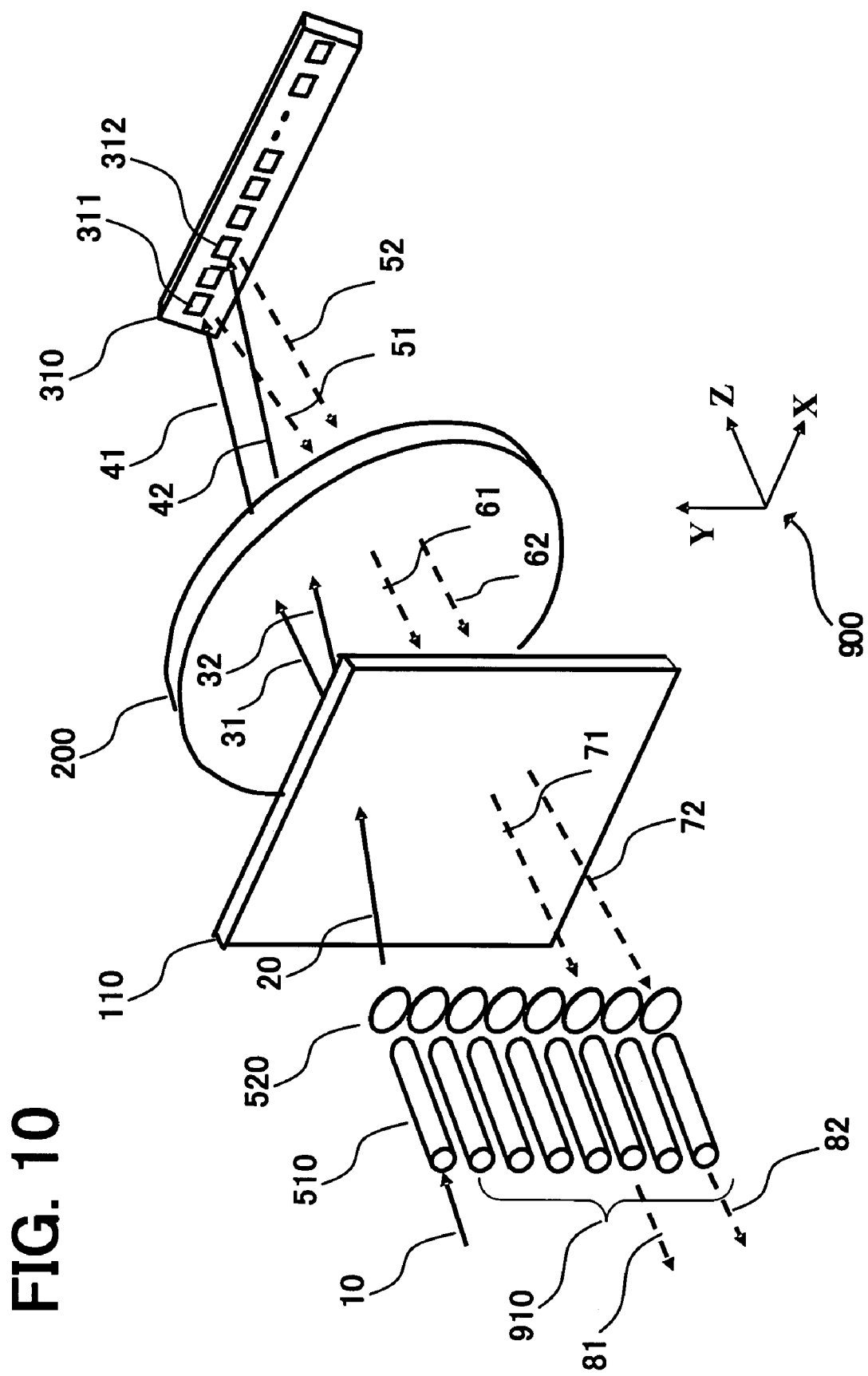
FIG. 10 is a first diagram illustrating a wavelength selection switch to which the present invention is applied.

FIG. 10 is a first arrangement of a wavelength selection switch to which the present invention is applied, illustrating a case wherein an MEMS (Micro-Electro Mechanical System) 310 serving as the light receiving means 300 is made up of one minute mirror row.

A beam 10 input to the headmost fiber of the fiber array 510 is input to the diffraction grating 110 via a lens array 520 disposed so as to couple with each fiber of the fiber array 510 as a beam 20. The beam 20 is dispersed into light components 31 and 32 by the diffraction grating 110 serving as one type of optical diffraction device, and the light components 31 and 32 are irradiated at minute mirrors 311 and 312 within the MEMS 310 via the focusing lens 200 as light components 41 and 42 respectively. The minute mirrors 311 and 312 reflect the incident light components in the direction of a predetermined angle, and output these to the focusing lens 200 as reflected beams 51 and 52 (dotted line arrow). Light components 61 and 62 focused via the focusing lens 200 are further passed through the diffraction grating 110 as light components 71 and 72, and output to predetermined fibers within the fiber array 510 as light components 81 and 82.

Figure 11:
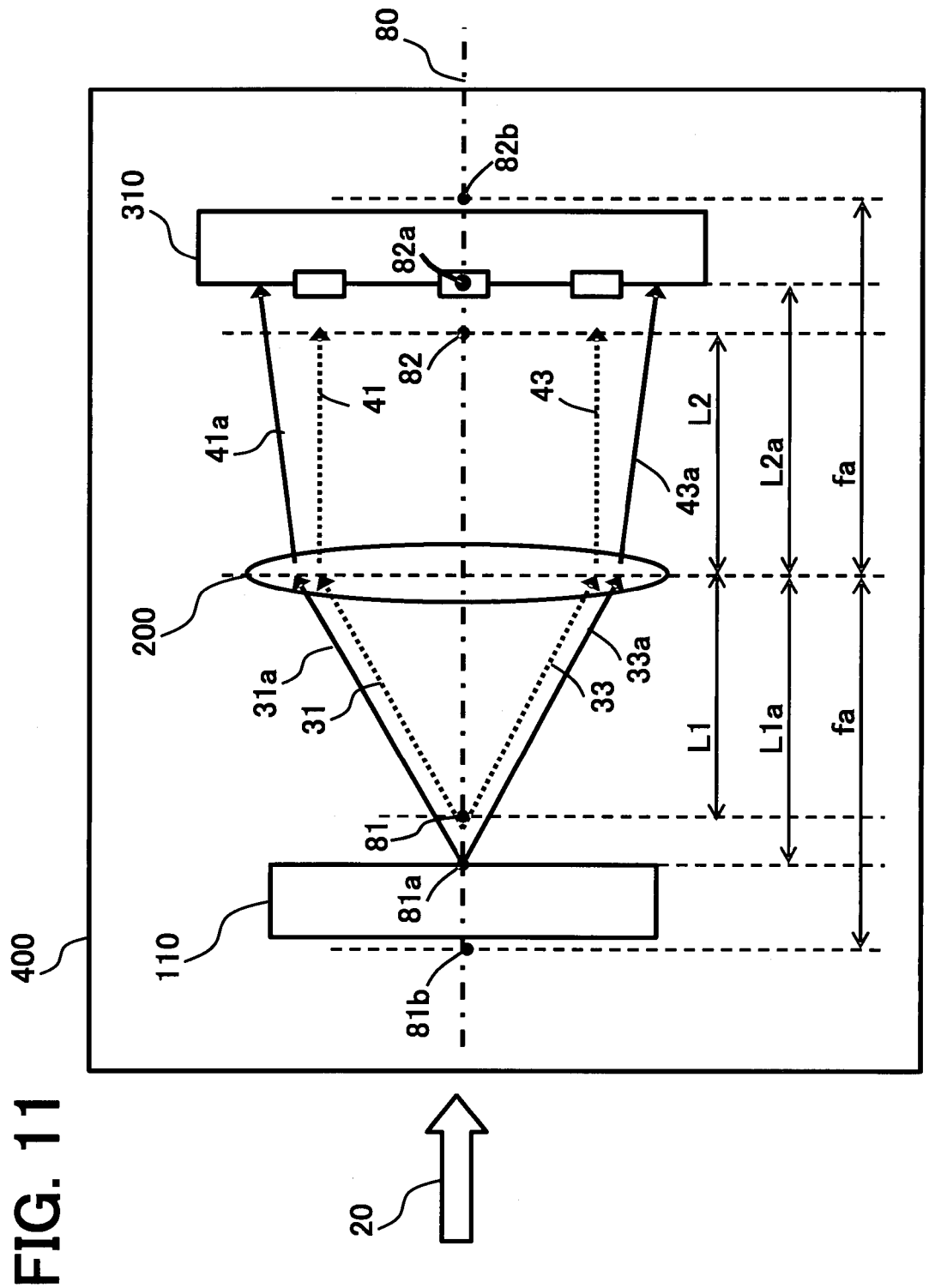
FIG. 11 is an explanatory diagram of the wavelength selection switch in FIG. 10 to which the present invention is applied.

Also, FIG. 11 is an explanatory diagram at the time of applying the present invention to the first arrangement of the wavelength selection switch shown in FIG. 10.

In the event of comparing this configuration with the configuration shown in FIGS. 2, 3, and 4 according to the first embodiment of the present invention, there are differences in that the light receiving means 300 is substituted with the MEMS 310, the optical diffraction device 100 is substituted with the diffraction grating 110, and detection of dispersed light components is performed by minute mirrors instead of the PD cells, but the placement relations of the respective devices of the diffraction grating 110, focusing lens 200, and MEMS 310, and a process wherein the light components dispersed are entered into the minute mirrors of the MEMS 310 from the diffraction grating 110 is the same as the process in FIGS. 2, 3, 5, and 6, and accordingly, the detailed description thereof will be omitted here.

With the above MEMS 310, the wavelength of a light component to be received is determined depending on the position where each of the minute mirrors is disposed, in the event of the incident position of the light component is shifted due to temperature change, the wavelength thereof is consequently misidentified, but the calculation process of the identification errors of light components dispersed due to temperature change is the same as the principle shown in the first embodiment of the present invention.

Though not shown in the drawing, the second embodiment of the present invention shown in FIGS. 7, 8, and 9 can be applied to the case of employing an MEMS as the light receiving means. In this case, the MEMS 310 shown in FIG. 10 is configured ad an MEMS including multiple minute mirror rows, whereby multiple beams can be input from the fiber array 510 to operate the wavelength selection switch. Also, with regard to athermalizing (temperature-independency) for suppressing influence due to temperature change also, the principle described with the second embodiment of the present invention can be applied in the same way.

Figure 12:
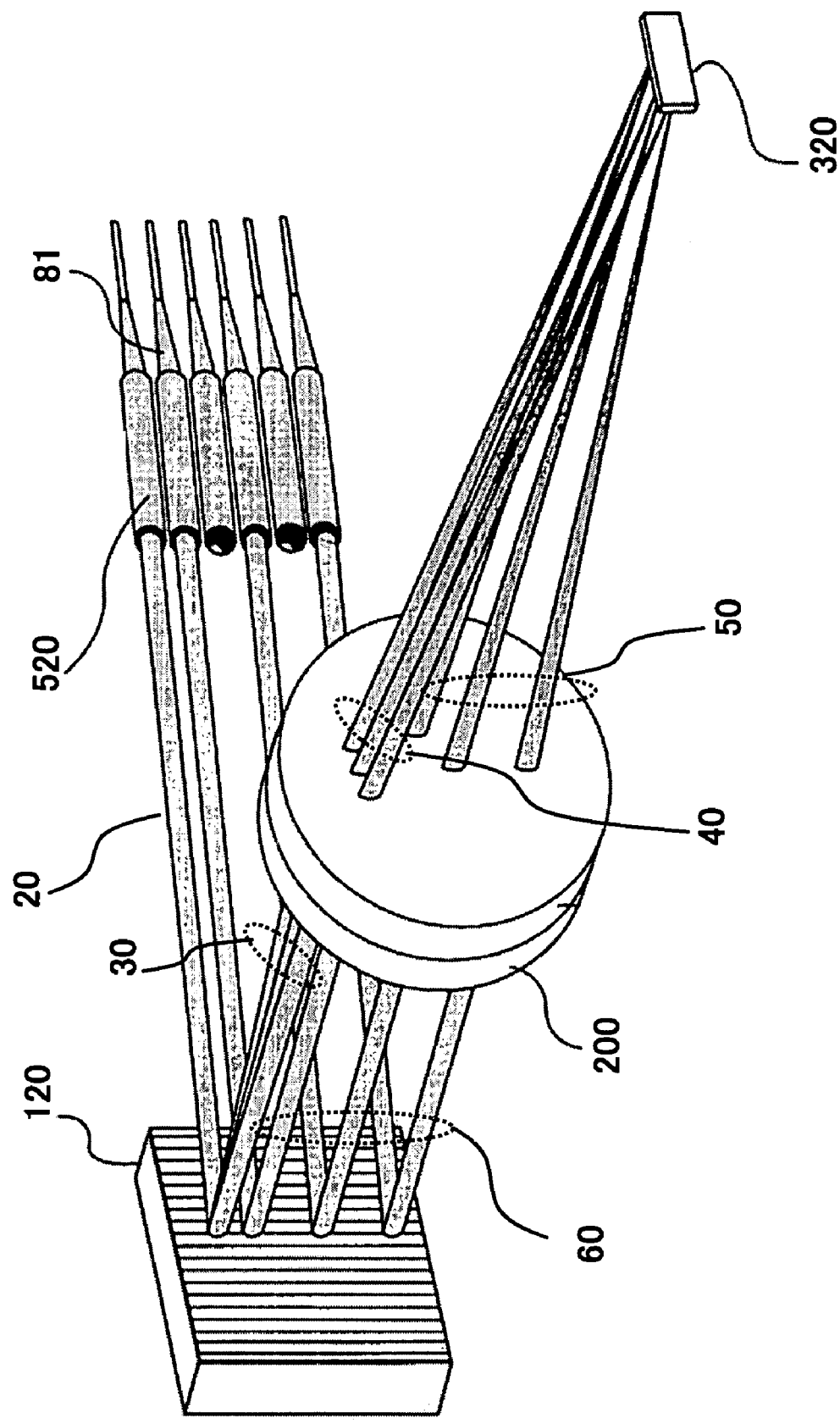
FIG. 12 is a second diagram illustrating a wavelength selection switch to which the present invention is applied.

FIG. 12 is a second arrangement of a wavelength selection switch to which the present invention is applied. A beam 20 outgoing from a collimator 520 is dispersed into light components 30 by wavelength at a diffraction grating 120 (dispersed into three light components in the drawing), focused into light components 40 by the focusing lens 200, and irradiated upon corresponding minute mirrors within an MEMS 320. Subsequently, the respective light components 50 reflected at the minute mirrors are irradiated upon the diffraction grating 120 via the focusing lens 200 as light components 60 again, and output to the corresponding optical cables.

The difference as to the configuration in FIGS. 2, 3, 5, and 6 showing the first embodiment of the present invention is in that the diffraction grating 120 serving as the diffraction device is not a transmission type, and with regard to the wavelength identification errors of the MEMS 320 due to temperature change in the event that the optical diffraction device 120, focusing lens 200, and MEMS 320 are disposed fixedly on a board (not shown), the same principle as that in the first embodiment of the present invention can be applied.

Though not shown in the drawing, the second embodiment of the present invention shown in FIG. 7 is applied to the case of employing an MEMS serving as the light receiving means, and the MEMS 320 shown in FIG. 12 is configured as an MEMS including multiple minute mirror rows, whereby multiple beams can be input from the collimator to operate the wavelength selection switch. In this case, the second embodiment of the present invention can be applied in the same way with regard to athermalizing (temperature independency) for suppressing influence due to temperature change as well.

What is claimed is:

1. An optical wavelength identification apparatus, comprising:
   an optical diffraction device for dispersing light into light components each having different wavelength;
   a focusing lens for focusing the light components dispersed from the optical diffraction device, the focusing lens having a predetermined focal length f and a focal length temperature coefficient $\beta$;
   a light receiving device for identifying wavelengths of the light components based on incident positions of the light components focused, the light receiving device being made of material having a predetermined temperature coefficient $\alpha_s$; and
   a board for fixing the optical diffraction device, the focusing lens, and the light receiving device, the board being made of material having a predetermined temperature coefficient $\alpha$, the distance between the focusing lens and the light receiving device being set at f;
   wherein, for a distance coefficient k ($0<k\leq1$), the distance between the optical diffraction device and the focusing lens is set at a product f·k, and the focal length temperature coefficient $\beta$ and the distance coefficient k are set such that the focal length temperature coefficient $\beta$ and the predetermined temperature coefficient $\alpha_s$ approximately satisfy a relational expression $\beta=(\alpha_s/k)-\alpha\cdot[(1/k)-1]$.

2. The optical wavelength identification apparatus of claim 1, wherein the focal length temperature coefficient $\beta$ is set at zero, and the distance coefficient k is set such that the predetermined temperature coefficient $\alpha_s$ and the predetermined temperature coefficient $\alpha_s$ approximately satisfy $k=1-\alpha_s/\alpha$.

3. The optical wavelength identification apparatus of claim 1, wherein the light receiving device comprises a PD array wherein PD cells for detecting light are disposed in one row with a predetermined interval on a light receiving surface of the PD array, and wavelengths of the light components are identified based on placement positions of the PD cells which have detected the light components entering the light receiving surface of the PD array.

4. The optical wavelength identification apparatus of claim 1, wherein the light receiving device is an MEMS wherein minute mirrors for reflecting light are disposed in one row with a predetermined interval on a light receiving surface of the MEMS, and wavelengths of the light components are identified based on placement positions of the minute mirrors where the light components have entered.

5. An optical wavelength identification method for detecting an optical wavelength, comprising:
   fixing, on a board, an optical diffraction device for dispersing light into light components by wavelength, a focusing lens for focusing the light components dispersed from the optical diffraction device, and a light receiving device for identifying wavelengths of the light components based on incident positions of the light components focused, the focusing lens having a predetermined focal length f and a focal length temperature coefficient $\beta$, the light receiving device being made of material having a predetermined temperature coefficient $\alpha_s$, the board being made of material having a predetermined temperature coefficient $\alpha$; and
   setting the distance between the focusing lens and the light receiving device being at f;
   wherein the distance between the optical diffraction device and the focusing lens is set at the product f·k of the focal length f and a distance coefficient k ($0<k\leq1$), and the temperature coefficient $\beta$ and a predetermined temperature coefficient $\alpha_s$ approximately satisfy a relational expression $\beta=(\alpha_s/k)-\alpha\cdot[(1/k)-1]$.

6. The optical wavelength identification method of claim 5, further comprising:
   setting the focal length temperature coefficient $\beta$ at zero; and
   setting the distance coefficient k such that the predetermined temperature coefficient $\alpha$ and the predetermined temperature coefficient $\alpha_s$ approximately satisfy $k=1-\alpha_s/\alpha$.

7. An optical wavelength identification apparatus comprising:
   a first focusing lens for focusing a plurality of lights entered via a fiber array;
   an optical diffraction device for dispersing each of the plurality of lights focused by the first focusing lens into light components by wavelength;
   a second focusing lens for focusing the dispersed light components;
   a light receiving device for identifying wavelengths of the light components focused by the second focusing; and
   a board for fixing the fiber array, the first focusing lens, the optical diffraction device, the second focusing lens, and the light receiving device thereon, the second focusing lens having a predetermined focal length f and a focal length temperature coefficient $\beta$, the light receiving device being made of a material having a predetermined temperature coefficient $\alpha_s$, the board being made of a material having a predetermined temperature coefficient $\alpha$,
   wherein, for a distance coefficient k ($0<k\leq1$), the distance between the optical diffraction device and the second focusing lens is set at the product f·k of the predetermined focal length f and the distance coefficient k, the distance between the second focusing lens and the light receiving device is set at f, and the temperature coefficient $\beta$, the predetermined temperature coefficient $\alpha$, and the predetermined temperature coefficient $\alpha_s$ approximately satisfy a relational expression $\beta=(\alpha_s/k)-\alpha\cdot[(1/k)-1]$.

8. The optical wavelength identification apparatus of claim 7, wherein the light receiving device includes a plurality of PD cell rows wherein PD cells for detecting light are disposed in one row with a predetermined interval on a light receiving surface of the light receiving device, and a wavelength of each of the light components of the plurality of lights is identified based on placement positions of the PD cells which have detected the light components.

9. The optical wavelength identification apparatus of claim 7, wherein the light receiving device includes a plurality of minute mirror rows wherein minute mirrors for reflecting light are disposed in one row with a predetermined interval on a light receiving surface of the light receiving device, and identifies a wavelength of each of the light components of the plurality of lights simultaneously based on placement positions of the minute mirrors where the light components have entered.

10. An optical wavelength identification method comprising:
focusing, via a first focusing lens, a plurality of lights to be entered via a fiber array;
dispersing each of the plurality of lights focused by the first focusing lens into light components by wavelength;
focusing the light components dispersed;
identifying a wavelength of each of the light components on the basis of an incident position on a light receiving surface of the light components focused;
fixing, on a board, the first focusing lens, the optical diffraction device, the second focusing lens, and the light receiving device, the second focusing lens having a predetermined focal length f and a temperature coefficient $\beta$, the light receiving device being made of a material having a predetermined temperature coefficient $\alpha_s$, the board being made of a material having a predetermined temperature coefficient $\alpha$;
setting the distance between the optical diffraction device and the second focusing lens at the product f·k of the focal distance f and a distance coefficient k (0<k≦1); and
setting the distance between the second focusing lens and the light receiving device at f,
wherein the temperature coefficient $\beta$, the predetermined temperature coefficient $\alpha$, and the predetermined temperature coefficient $\alpha_s$ approximately satisfy a relational expression $\beta=(\alpha_s/k)-\alpha\cdot[(1/k)-1]$.

11. The optical wavelength identification method of claim 10, wherein a plurality of PD cell rows where PD cells for detecting light are disposed in one row with a predetermined interval on the light receiving surface, and a wavelength of each of the light components of the plurality of lights is identified on the basis of placement positions of the PD cells which have detected the light components.

12. The optical wavelength identification method of claim 10, wherein a plurality of minute mirror rows wherein minute mirrors for reflecting light are disposed in one row with a predetermined interval on the light receiving surface, and a wavelength of each of the light components of the plurality of lights is identified on the basis of placement positions of the minute mirrors where the light components have entered.

13. An apparatus, comprising:
an optical diffraction device dispersing light;
a focusing lens focusing the light dispersed from the optical diffraction device, the focusing lens having a predetermined focal length f and a focal length temperature coefficient $\beta$;
a light receiving device being made of material having a predetermined temperature coefficient $\alpha_s$; and
a board fixing the optical diffraction device, the focusing lens, and the light receiving device, the board being made of material having a predetermined temperature coefficient $\alpha$;
wherein, for a distance coefficient k (0<k≦1), the distance between the optical diffraction device and the focusing lens is set at a product f·k, and the focal length temperature coefficient $\beta$ and the distance coefficient k are set such that the focal length temperature coefficient $\beta$ and the predetermined temperature coefficient $\alpha_s$ approximately satisfy a relational expression $\beta=(\alpha_s/k)-\alpha\cdot[(1/k)-1]$.

* * * * *